Patented Feb. 7, 1950

2,496,582

UNITED STATES PATENT OFFICE 2,496,582

PROCESS OF CONCENTRATING POLYALKYLENE OXIDE CONDENSATION PRODUCTS

Charles R. Enyeart, Easton, Pa., assignor to General Aniline & Film Corporation, New York, N. Y., a corporation of Delaware No Drawing. Application August 9, 1945,
Serial No. 609,925

2 Claims. (Cl. 260—613)

The present invention relates to a process of treating and concentrating aqueous solutions of water soluble organic compounds containing a polyalkylene oxide ether group.

The process of the present invention is applicable to the treatment of the broad class of organic compounds containing a polyalkylene oxide ether group, of the type described for example, in United States Patents No. 1,970,578 to Schoeller et al., No. 2,213,477 to Steindorff et al., No. 2,174,761 to Schuette et al., No. 2,174,762 to Schuette et al., and elsewhere; and which are derivatives of water insoluble monomeric organic compounds selected from the group consisting of hydroxyl, carboxyl and amino compounds containing at least 6 carbon atoms, which derivatives contain a polyalkylene oxide radical with at least four alkyleneoxy groups. These compounds, which will hereinafter be referred to as "polyalkylene oxide products," are characterized by the following general formula:

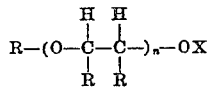

in which R stands for a member of the group consisting of alkyl and aryl radicals, including groups derived by the substitution thereof, or an amino group, and OX denotes either a hydroxyl-, a monoalkyl or aryl ether or ester radical, and $n$ denotes an integer above three.

Such compounds are oily to fatty or wax-like water soluble materials. It should be understood that the term "water soluble," as employed throughout the present specification and claims, includes compounds which are colloidally soluble, unless it is otherwise specifically limited. These new compounds have found extensive use in the arts as wetting, washing, dispersing, levelling, softening and like agents, in the textile, paper, leather, lacquer, rubber, cosmetic and pharmaceutical industries, either alone or in admixture with other treating agents. For such uses, they are frequently sold in the form of relatively concentrated aqueous solutions.

While these water soluble polyalkylene oxide products may readily be prepared in good yield, for instance, by the process described in the above-mentioned patent, it has been found that it is difficult to subject them to any further treatment, for instance, treatment with common adsorbents, such as, Fuller's earth, activated charcoal, silica gel, and the like, to improve their color or odor, due to impurities in the compounds from which they are made, or for a variety of other reasons. Even relatively concentrated solutions of these compounds cannot readily be subjected to usual purification processes and other treatment, since such concentrated solutions are too viscous to be readily handled. Heretofore, it has been impracticable to sufficiently dilute the compounds in order to obtain a fluid material which could be readily treated since the cost of removing the solvent, in order to produce a solution of sufficient concentration to be commercially acceptable, has been practically prohibitive.

It has now been discovered that if the water soluble polyalkylene oxide products are diluted with water so as to form a relatively dilute aqueous solution which is fluid and readily handleable, such dilute aqueous solution may readily be subjected to many desired treating processes and following such treatment, the dilute solution may readily be separated into two phases, one of which is a commercially acceptable solution, by merely heating the same.

It is, therefore, an object of the present invention to provide a simplified method of treating and concentrating water soluble polyalkylene oxide products. Other and further objects will be apparent as the present description progresses.

In practicing the present invention, a water soluble polyalkylene oxide product is diluted with water until a solution of the desired fluidity is obtained. The particular degree of dilution which is necessary will vary with the particular compound to be treated and also, of course, with the fluidity which is desired. In order to obtain the desired degree of fluidity, a dilution of at least 3 parts of water to 1 part of polyalkylene oxide product is generally necessary. However, too dilute a solution will not separate into separate phases on heating, or will require heating to a relatively high temperature, so that a more dilute solution than that necessary to obtain a readily flowable solution should, in general, be avoided. A preferred range of dilution is approximately 5 parts of water to 1 part of organic compound.

The dilute solution may then be treated in any desired manner, for instance, by contacting the same with a solid adsorbent which may then be removed by filtration. The purified filtrate is then concentrated by heating the same to an elevated temperature and allowed to stand at such elevated temperature. Thereupon, it will separate into two phases, one an organic phase and the other a supernatent water phase. It has been found that the relative concentration of the water soluble polyalkylene oxide product in the organic phase which separates on standing at an elevated temperature, increases as the temperature, to which the dilute solution is heated, is increased. Therefore, the exact temperature to which the solution is heated may be varied somewhat, depending on the concentration desired in the organic phase. When the solution is heated to the boiling point of water at atmospheric pressure, it has been found that the organic phase, which separates on standing, will, in general, have a concentration of from 33% to 50%, depending on the particular solute. If a more highly concentrated organic phase is desired, higher temperatures may be obtained by the use of pressure. Somewhat lower temperatures may be employed when a solution having a lower concentration than the organic phase obtained at about 100° C. is desired. In general, however, when such a less concentrated solution is desired, it is preferable to heat the dilute solution to about 100° C. and permit it to stand and separate into two layers and remove therefrom so much of the aqueous phase that, on cooling and mixing the remainder of the aqueous phase with the organic phase, a solution of the desired concentration is obtained. Those skilled in the art can readily determine by simple preliminary test the particular degree of separation which may be obtained at any given temperature, or conversely the particular temperature necessary to effect any given degree of separation.

It will be understood that the aqueous phase still contains an appreciable quantity of the polyalkylene oxide product. In order to avoid loss of this compound, it is preferable to employ the aqueous phase which is recovered from one concentration to dilute a subsequent charge of material to be treated. In this manner, substantially 100% recovery of the polyalkylene oxide ether compound is obtained.

The present invention will be understood from the following specific example, which is illustrative of the same.

*Example*

A 33% aqueous solution of a commercial polyethylene oxide ether of di-isobutyl phenol, having the following formula:

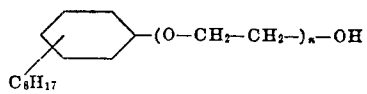

in which $n$ is a whole number from 10 to 50, which was obtained by condensing di-isobutyl phenol with ethylene oxide in molar proportions of about 1 mole of di-isobutyl phenol to from 10 to 50 moles of ethylene oxide, as described in United States Patent No. 2,213,477, and which was dark amber in color and slightly cloudy, and with a slight odor, was diluted with an equal volume of water. The dilute solution was then heated at the boil for 15 minutes with charcoal and then filtered. The filtrate was again heated to a boil and allowed to stand. On standing, the filtrate separated into an organic layer and a supernatent aqueous layer, the aqueous layer being about three times the volume of the organic layer. It was found that the decanted aqueous layer contained 10% of the polyethylene oxide ether of di-isobutyl phenol, while the organic layer was a 50% solution. A sufficient amount, slightly more than two-thirds, of the aqueous layer was drawn off so that, on cooling and mixing of the organic layer and the remainder of the aqueous layer, a 33% solution of polyethylene oxide ether of di-isobutyl phenol was obtained, in a yield of about 88%. This product was clear and had no odor and was light amber in color.

The decanted aqueous layer obtained above was then employed to dilute an equal amount of a second commercial impure 33% solution of the polyethylene oxide ether of di-isobutyl phenol and the thus obtained dilute solution purified and concentrated as above described. The total recovery in this case, of the polyethylene oxide ether, was over 97%.

In place of the polyethylene oxide ether of di-isobutyl phenol, the polyethylene oxide ethers of other hydroxy compounds containing more than 6 carbon atoms, for instance, those obtained by reacting at least 3 and preferably from 6 to 100 molar proportions of ethylene oxide with one molar proportion of such hydroxy compounds as cyclohexanol, octodecanol, oleyl alcohol or tri-isobutyl phenol, etc., may be treated and concentrated in the same manner. Likewise, the esters obtainable by reacting at least 3 and preferably from 6 to 100 molar proportions of ethylene oxide with one molar proportion of a carboxyl compound, such as, caproic acid, oleic acid, stearic acid and the like, or the condensation product of an amine, such as, decylamine, cetylamine, dibutylamine, octadecylamine, or diphenylamine, with a polyglycol compound, may be purified in the same manner as the polyethylene oxide ether of isooctyl phenol mentioned above. It should also be understood that in place of the polyethylene oxide condensation product, the corresponding condensation products with other alkylene oxides, such as, propylene oxide, butylene oxide and the like, or mixtures of the same, with each other or ethylene oxide, may be employed.

I claim:

1. The process of treating a water-soluble polyglycol ether of an alkyl phenol, said polyglycol ether having the formula

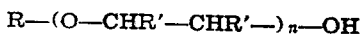

in which R stands for the hydrocarbon residue of an alkyl phenol, R' stands for a member of the group consisting of hydrogen and lower alkyl, and $n$ is at least 6, which comprises diluting said polyglycol ether with an aqueous medium to form a fluid dilute solution, contacting the dilute solution with a solid adsorbent, removing the adsorbent therefrom, heating the dilute solution to a temperature of about 100° C. and maintaining said solution at said temperature until it separates into an aqueous and organic phase, separating the two phases and using the thus-obtained aqueous phase as the aqueous medium in the dilution step specified.

2. The process of treating water-soluble derivatives of water-insoluble monomeric compounds of the formula R—X, wherein R stands for a member of the group consisting of alkyl and aryl radicals and X stands for a radical containing an active hydrogen atom and selected from the group consisting of hydroxyl, carboxyl and amino radicals, which derivatives contain a polyalkylene oxide radical in place of said active hydrogen, which comprises diluting said derivative with an aqueous medium of the type hereinafter specified to form a fluid dilute solution, contacting the dilute solution with a solid adsorbent, removing the adsorbent therefrom, heating the dilute solution to a temperature of about 100° C., maintaining said temperature until said dilute solution separates into an aqueous and organic phase, separating the two phases and employing the thus-obtained aqueous phase as the aqueous medium employed in the dilution step specified.

CHARLES R. ENYEART.

REFERENCES CITED

The following references are of record in the file of this patent:

UNITED STATES PATENTS

| Number | Name | Date |
|---|---|---|
| 2,153,704 | Werner | Apr. 11, 1939 |
| 2,307,058 | Moeller | Jan. 5, 1943 |
| 2,317,726 | Boedeker | Apr. 27, 1943 |
| 2,376,008 | Riethof | May 15, 1945 |

OTHER REFERENCES

Science News Letter, March 22, 1947, page 188.
Glasstone, "Text Book of Physical Chemistry," 1940, pages 716–718, Van Nostrand, New York.